(12) United States Patent
Shooshtari et al.

(10) Patent No.: US 7,825,214 B2
(45) Date of Patent: Nov. 2, 2010

(54) PURIFIED STYRENE-MALEIC ANHYDRIDE POLYMER BINDER

(75) Inventors: Kiarash Alavi Shooshtari, Littleton, CO (US); Jawed Asrar, Greenwood Village, CO (US)

(73) Assignee: Johns Manville, Denver, CO (US)

( * ) Notice: Subject to any disclaimer, the term of this patent is extended or adjusted under 35 U.S.C. 154(b) by 44 days.

(21) Appl. No.: 12/008,908

(22) Filed: Jan. 15, 2008

(65) Prior Publication Data
US 2009/0182108 A1 Jul. 16, 2009

(51) Int. Cl.
*C08G 73/10* (2006.01)
*C08F 20/04* (2006.01)

(52) U.S. Cl. .............. 528/497; 252/8.84; 427/385.5; 427/389.8; 526/318.3

(58) Field of Classification Search ............... 252/8.84; 427/385.5, 389.8; 528/497
See application file for complete search history.

(56) References Cited

U.S. PATENT DOCUMENTS

| | | | |
|---|---|---|---|
| 5,143,582 A | 9/1992 | Arkens et al. | |
| 5,318,990 A | 6/1994 | Strauss | |
| 5,340,868 A | 8/1994 | Strauss | |
| 5,427,587 A | 6/1995 | Arkens et al. | |
| 5,492,976 A * | 2/1996 | Shalati et al. | ............... 525/285 |
| 5,661,213 A | 8/1997 | Arkens et al. | |
| 6,136,916 A | 10/2000 | Arkens et al. | |
| 6,221,973 B1 | 4/2001 | Arkens et al. | |
| 6,331,350 B1 | 12/2001 | Taylor et al. | |
| 6,706,853 B1 | 3/2004 | Stanssens et al. | |
| 7,112,693 B2 * | 9/2006 | Tillack et al. | ............... 558/276 |
| 2007/0232604 A1 * | 10/2007 | Bhagwat et al. | ............. 514/232.8 |
| 2008/0274291 A1 * | 11/2008 | Shooshtari | ............... 427/389.8 |

FOREIGN PATENT DOCUMENTS

EP 0 583 086 A1 2/1994

OTHER PUBLICATIONS

Formaldehyde-Free Crosslinking Binders for Nonwovens, Charles T. Arkens et al., Tappi Journal, vol. 78, No. 11, pp. 161-168, Nov. 1995.

* cited by examiner

*Primary Examiner*—Terressa M Boykin
(74) *Attorney, Agent, or Firm*—Robert D. Touslee

(57) ABSTRACT

An aqueous binding composition is provided comprised of a polyanhydride based polymer, which polyanhydride based polymer has been purified through the use of an azeotrope. The resulting binder is effective, particularly for binding glass fibers, yet substantially odor free. A fibrous material is provided that is coated with a water-resistant cured binder formed in accordance with the process of the present invention wherein adjoining fibers are bound at cross-over points. Such bound fibrous material is free of a phenol-formaldehyde resin and substantially free of odor. It has been found that by removing purities such as cumene and acetophenone from a polyanhydride binder, e.g., a styrene maleic anhydride based polymer based binder, an effective binder for glass fiber is obtained while also avoiding an odor problem.

12 Claims, No Drawings

PURIFIED STYRENE-MALEIC ANHYDRIDE POLYMER BINDER

BACKGROUND OF THE INVENTION

1. Field of the Invention

The subject invention pertains to an improved aqueous binding composition for use with fibrous materials. More specifically, the subject invention pertains to a purified polyanhydride based binder composition, preferably one based on a styrene maleic anhydride polymer.

2. Description of the Related Art

Binders for fibrous materials, such as fiberglass, have a variety of uses ranging from stiffening applications where the binder is applied to woven or non-woven fiberglass sheet goods and is cured, producing a stiffer product; thermo-forming applications wherein the binder resin is applied to a sheet or lofty fibrous product, following which it is dried and optionally is B-staged to form an intermediate but yet curable product; and to fully cured systems such as building insulation.

Fibrous glass insulation products generally comprise matted glass fibers bonded together by a cured thermoset polymeric material. Molten streams of glass are drawn into fibers of random lengths and are blown into a forming chamber where they are randomly deposited as a mat onto a traveling conveyor. The fibers, while in transit in the forming chamber and while still hot from the drawing operation, are sprayed with an aqueous binder. A phenol-formaldehyde binder has been used throughout the fibrous glass insulation industry. The residual heat from the glass fibers and the flow of air through the fibrous mat during the forming operation are generally sufficient to volatilize water from the binder, thereby leaving the remaining components of the binder on the fibers as a viscous or semi-viscous high solids liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins are not suitable for use as fiberglass binders. One skilled in the art of fiberglass binders would not look to cellulosic binders to solve any of the known problems associated with fiberglass binders or binders for use on similar fibrous materials.

Binders useful in fiberglass insulation products generally require a low viscosity in the uncured state, yet possess characteristics so as to form a rigid thermoset polymeric mat for the glass fibers when cured. A low binder viscosity in the uncured state is required to allow the mat to be sized correctly. Also, viscous binders tend to be tacky or sticky and hence they lead to the unwanted accumulation of fiber on the forming chamber walls. This accumulated fiber may later fall onto the mat causing dense areas and product problems. A binder which forms a rigid matrix when cured is required so that a finished fiberglass thermal insulation product or similar product, when compressed for packaging and shipping, will recover somewhat to its as-made vertical dimension when installed in a building.

From among the many thermosetting polymers, numerous candidates for suitable thermosetting fiberglass binder resins exist. However, binder-coated fiberglass products are often of the commodity type, and thus cost becomes a driving factor, generally ruling out in some instances such resins as thermosetting polyurethanes, epoxies, and others. Due to their excellent cost/performance ratio, the resins of choice in the past have been phenol-formaldehyde resins. Phenol-formaldehyde resins can be economically produced, and can be extended with urea prior to use as a binder in many applications. Such urea-extended phenol-formaldehyde binders have been the mainstay of the fiberglass insulation industry for years, for example.

Over the past several decades however, minimization of volatile organic compound emissions (VOCs) both on the part of the industry desiring to provide a cleaner environment, as well as by government regulation, has led to extensive investigations into not only reducing emissions from the current formaldehyde-based binders, but also into candidate replacement binders. For example, subtle changes in the ratios of phenol to formaldehyde in the preparation of the basic phenol-formaldehyde resole resins, changes in catalysts, and addition of different and multiple formaldehyde scavengers, has resulted in considerable improvement in emissions from phenol-formaldehyde binders as compared with the binders previously used. However, with increasingly stringent government regulations, more and more attention has been paid to alternative binder systems which lack formaldehyde.

One such candidate binder system employs polymers of acrylic acid as a first component, and a polyol such as glycerine or a modestly oxyalkylated glycerine as a curing or "crosslinking" component. The preparation and properties of such poly(acrylic acid)-based binders, including information relative to the VOC emissions, and a comparison of binder properties versus urea formaldehyde binders is presented in "Formaldehyde-Free Crosslinking Binders For Non-Wovens", Charles T. Arkins et al., TAPPI JOURNAL, Vol. 78, No. 11, pages 161-168, November 1995. The binders disclosed by the Arkins article, appear to be B-stageable as well as being able to provide physical properties similar to those of urea-formaldehyde resins.

U.S. Pat. No. 5,340,868 discloses fiberglass insulation products cured with a combination of a polycarboxy polymer, a beta-hydroxyalkylamide, and at least one trifunctional monomeric carboxylic acid, such as citric acid. The specific polycarboxy polymers disclosed are poly(acrylic acid) polymers. See also, U.S. Pat. No. 5,143,582

U.S. Pat. No. 5,318,990 discloses a fibrous glass binder which comprises a polycarboxy polymer, a monomeric trihydric alcohol and a catalyst comprising an alkali metal salt of a phosphorous-containing organic acid.

Published European Patent Application EP 0 583 086 A1 appears to provide details of polyacrylic acid binders whose cure is catalyzed by a phosphorus-containing catalyst system as discussed in the Arkins article previously cited. Higher molecular weight poly(acrylic acids) are stated to provide polymers exhibiting a more complete cure. See also U.S. Pat. Nos. 5,661,213; 5,427,587; 6,136,916; and 6,221,973.

Some polycarboxy polymers have been found useful for making fiberglass insulation products. Problems of clumping or sticking of the glass fibers to the inside of the forming chambers during the processing, as well as providing a final product that exhibits the recovery and rigidity necessary to provide a commercially acceptable fiberglass insulation product, have been overcome. See, for example, U.S. Pat. No. 6,331,350. The thermosetting acrylic resins have been found to be more hydrophilic than the traditional phenolic binders, however. This hydrophilicity can result in fiberglass insulation that is more prone to absorb water, thereby possibly compromising the integrity of the product. Also, the thermosetting acrylic resins now being used as binding agents for fiberglass have been found to not react as effectively with silane coupling agents of the type traditionally used by the industry. The addition of silicone as a hydrophobing agent results in problems when abatement devices are used that are based on incineration. Also, the presence of silicone in the manufacturing process can interfere with the adhesion of certain facing substrates to the finished fiberglass material. Overcoming these problems will help to better utilize polycarboxy polymers in fiberglass binders.

U.S. Pat. No. 6,706,853 discloses a reaction product of a cyclic anhydride and an alkanolamine for use when binding fiberglass. Representative cyclic anhydrides include anhydride polymers of maleic anhydride with styrene and with methacrylate monomers.

Low molecular weight styrene maleic anhydride (SMA) polymers and polymers based on SMA have been utilized as binders for fibrous materials. These low molecular weight SMA resins are generally synthesized via free radical polymerization of styrene with maleic anhydride in a solvent such as cumene that acts as a chain transfer agent. The initiators of choice are peroxides and hydroperoxides such as cumene hydroperoxide, CHP. During synthesis of SMA, CHP can generate acetophenone as a by-product. Presence of the solvent cumene and CHP as contaminants in the final product (SMA) is undesirable. Their presence can create an undesirable color. Manufacturers attempts to remove these impurities, however by flash drying and vacuum drying SMA, has not been enough to eliminate the odor problem.

It is therefore an object of the present invention to provide an improved binding composition for use when binding fibrous materials in the absence of the use of a phenol-formaldehyde binder, and in particular comprising a polyanhydride composition such as a SMA based composition.

It is an object of the present invention to provide an improved process for binding a fibrous material to provide an improved water-resistant cured binder in association with a fibrous material wherein adjoining fibers are bound at cross-over points, the process involving the use of an SMA based binder composition.

Other objects and advantages of the invention will be apparent to those skilled in the art upon a review of the following description and appended claims.

SUMMARY OF THE INVENTION

An aqueous binding composition is provided comprised of a polyanhydride based polymer, which polyanhydride based polymer has been purified through the use of an azeotrope. The resulting binder is effective, particularly for binding glass fibers, yet is substantially odor free.

A fibrous material is provided that is coated with a water-resistant cured binder formed in accordance with the process of the present invention wherein adjoining fibers are bound at cross-over points. Such bound fibrous material is free of a phenol-formaldehyde resin, comprising a polyanhydride based binder, and substantially free of odor.

Among other factors, it has been found that by removing purities such as cumene and acetophenone from a polyanhydride based polymer in preparing a binder composition, e.g., a styrene maleic anhydride based polymer binder, an effective binder for glass fiber is obtained while also avoiding an odor problem. The impurities of cumene, often used as a solvent and chain transfer agent that limits the MW of the polyanhydride, such as styrene maleic anhydride, and acetophenone, are found in the polyanhydride when introduced during the preparation reaction of the polymer. Using the azeotrope methods of the present invention effectively removes the impurities from the polymer to a level that the odor problem is avoided.

DESCRIPTION OF PREFERRED EMBODIMENTS

The aqueous binding composition for a fibrous material according to the present invention comprises a purified polyanhydride based polymer. The polymer is purified of any organic solvent residue, and in particular, of the impurities cumene and acetophenone. While the present invention will be described with regard to the removal of the specific impurities cumene and acetophenone, which are of particular concern, it is understood that the use of an azeotrope can be utilized to remove any organic solvent impurity or residue.

Representative polyanhydrides include polyacrylic anhydride, polymethacrylic anhydride, pyromellitic anhydride, poly(acrylic-co-methacrylic)anhydride, poly(acrylic-co-maleic)anhydride, poly(methacrylic-co-maleic)anhydride, polycrotonic anhydride, polymaleic anhydride, poly(styrene-maleic)anhydride, poly(ethylene-maleic) anhydride, poly(propylene-maleic)anhydride, poly(vinylether-maleic)anhydride, poly(butadiene-maleic) anhydride, poly(acrylamide-maleic) anhydride, malienated oils, and mixtures of the foregoing. The malienated oils are formed by the reaction of unsaturated oils with maleic anhydride. Other copolymer units can be similarly present within the polyanhydrides. A preferred polyanhydride is poly(styrene-maleic)anhydride.

The odor problems which exist when working polyanhydrides, and in particular styrene maleic anhydride, is overcome by successfully removing cumene and acetophenone impurities from the polymer to an extent that odor is no longer an issue. The odor is traced to these impurities, which are generally introduced during the manufacturing process. Cumene, for example, may be present in dry styrene maleic anhydride polymer powder in a concentration of about 0.2% by weight, and acetophenone in a concentration of about 0.1% by weight.

Five different routes can be used effectively to remove the impurities, with the use of a binary or ternary azeotrope being most effective. The five routes are:

(1) Form a water solution of SMA adduct and remove an azeotrope mixture of cumene and acetophenone by heating at 93° C. as a binary azeotrope.

(2) Form a water and toluene solution of SMA adduct and remove an azeotrope mixture of cumene, acetophenone, and toluene as a ternary azeotrope at 85° C.

(3) Form a solution of SMA adduct in water and introduce steam at the bottom to carry impurities away.

(4) Form a solution of SMA adduct and pass through an adsorbing column (e.g., activated carbon) to remove impurities and retain them in the column.

(5) Form an aqueous solution of SMA adduct and use liquid/liquid extraction with aromatic or non-aromatic solvents. The impurities would end up in the organic layer.

The polyanhydride based resin can comprise the polyanhydride polymer itself, preferably styrene maleic anhydride, or the polymer reacted with chemicals that react with anhydrides such as water, alcohols, amines, ammonia, alkanol amines, etc. Of preference is the reaction with ammonia or an amine to form a polyamic acid.

Other than ammonia, representative amines for reaction with the polyanhydride are primary and secondary amines. Such amines may be aliphatic, aromatic or a combination of aliphatic and aromatic. Additionally, the amine compounds optionally can include other functional groups. A representative functionalized amine is glycine (i.e., aminoacetic acid). Preferred primary alkylamines are methylamine, propylamine, n-butylamine, t-butylamine, hexylamine, benzylamine, etc. Preferred secondary alkylamines are dimethylamine, dipropylamine, methylethyl amine, dihexylamine, etc. Other amines including analine, hydrazine, morpholine, piperidine, piperazine, dicyclohexylamine, N-methylaniline, imidazole-4-acrylic acid, and other amino acids, can be utilized during the formation of the polyamic acid. Mixtures of amine compounds can be utilized.

A polyamic acid is commonly formed by reacting a polyanhydride with ammonia or an amine. The reaction can take place, for example, by heating the reactants while in admixture in an aqueous medium at a temperature below 100° C., and preferably at a temperature of approximately 30 to 95° C. for 10 to 240 minutes. The resulting polyamic acid possesses both reactive amide and carboxylic acid groups, and can be provided at least partially as an ammonia or amine salt.

The polyanhydride based polymer can also be an amine salt by dissolving the polymer in water containing any tertiary amine, such as triethanolamine. The polymer is then converted into a salt of the triethanolamine, which can then be purified.

Next the polyanhydride or polyamic acid and an organic crosslinking agent capable of undergoing a crosslinking reaction with the polymers when heated are applied from an aqueous binding composition as a coating on the fibrous material that is to be bound. Commonly the organic crosslinking agent is a polyol, polyamine, polyalkanolamine, or mixtures of these. Any organic crosslinking reaction can be utilized which has the ability to react with carboxylic acids anhydrides and/or amides. Such organic crosslinking agents commonly are water-soluble. Representative organic crosslinking agents include glycols, glycol ethers, polyamines, alkanolamines, polyester polyols, polyether polyols, acrylic polyols, urethane polyols, polysaccharides, polyvinyl alcohol, epoxies, and mixtures thereof. Representative polyamines include hexanediamine, ethylenediamine, melamine, diethylenetriamine, triethylenetetramine, aminoaniline, aminoamides, etc. Representative alkanolamines include monoethanolamine, diethanolamine, triethanolamine, and mixtures thereof. Trimethylol propane, pentaerythritol, ethylene glycol, and triethylene glycol also are representative of suitable organic crosslinking agents.

In a preferred embodiment when a polyamic acid is used, the organic crosslinking agent is a water-soluble Michael adduct crosslinking agent having reactive hydroxyl end groups formed by the addition reaction of a Michael acceptor compound having alpha-beta unsaturation attached to an electron-withdrawing group and a nucleophilic compound serving as a Michael donor capable of reaction with the Michael acceptor. Such Michael adduct is capable of undergoing a covalent crosslinking reaction with the water-soluble polyamic acid.

Such Michael acceptors may include at least one vinyl group (i.e., one or more vinyl groups) attached to the electron-withdrawing groups. Representative electron-withdrawing groups include ester groups, acid groups, amide groups, nitro groups, nitrile groups, ketone groups, aldehyde groups, and mixtures of these.

Representative Michael acceptors in the form of alpha-beta unsaturated esters include acrylates, such as ethyl acrylate, propyl acrylate, hydroxy ethyl acrylate, triethylene glycol diacrylate, trimethylolpropane triacrylate, pentaerythrytol tetraacrylate, epoxy acrylates such as bisphenol-A epoxy acrylate, epoxidized oil acrylate, styrene maleic anhydride acrylate, polyester polyol polyacrylates, polyurethane acrylates, metallic acrylates such as zinc diacrylate, polyamide acrylates, acryloyl propane triethoxy silane, di- and poly (dimethyl silanol)diacrylate, etc.; methacrylates, such as methyl methacrylate, hydroxy ethyl methacrylate, triethylene glycol dimethacrylate, trimethylol propane trimethacrylate, epoxy methacrylates, polyester methacrylates, polyurethane methacrylates, polyamide methacrylates, styrene maleic anhydride methacrylate, etc.; crotonates, such as methyl crotonate, hydroxy ethyl crotonate, epoxy crotonates, urethane crotonates, polyether crotonates, polyester crotonates, etc.; maleates, such as monomethyl maleate, dimethyl maleate, monohydroxy ethyl maleate, dihydroxy ethyl maleate, unsaturated esters containing maleate functionalities, epoxy maleate esters, etc.; fumarates, such as dimethyl fumarate, monohydroxy ethyl fumarate, dihydroxy ethyl fumarate, unsaturated esters containing fumarate functionalities, epoxy fumarate esters, etc.

Representative Michael acceptors in the form of alpha-beta unsaturated acids include acrylic acid, methacrylic acid, crontic acid, maleic acid, fumaric acid, 2-methyl maleic acid, itaconic acid, 2-methyl itaconic acid, propiolic acid, acetylene dicarboxylic acid, etc.

Representative Michael acceptors in the form of alpha-beta unsaturated amides include acrylamide, methacrylamide, etc.

Representative Michael acceptors in the form of alpha-beta unsaturated nitro compounds include vinyl nitrate, nitro ethylene, nitro acetylene, etc.

Representative Michael acceptors in the form of alpha-beta unsaturated nitrile compounds include acrylonitrile, methacrylonitrile, crotonitrile, etc.

Representative Michael acceptors in the form of alpha-beta unsaturated ketone compounds include methyl vinyl ketone, ethyl vinyl ketone, etc.

Representative Michael acceptors in the form of alpha-beta unsaturated aldehyde compounds include acrolein, methyl acrolein, etc.

The alpha-beta unsaturated Michael acceptor optionally may include additional chemical functionalities such as ether groups, ester groups, epoxy groups, urethane groups, urea groups, aliphatic hydrocarbon groups, aromatic hydrocarbon groups, etc. Michael acceptors in the form of oligomers of glycols and polyols may be utilized.

Maleic anhydride, acrylic anhydride, etc. also can be utilized as the Michael acceptor when forming the Michael adduct crosslinking agent.

The Michael acceptors readily undergo an addition reaction with a nucleophilic compound serving as a Michael donor through covalent bonding to form a water-soluble Michael adduct crosslinking agent having reactive hydroxyl groups. In preferred embodiments the Michael donor utilized to form the water-soluble Michael adduct crosslinking agent is an alkylamine, an alkanolamine, a thiol, and mixtures of these. Representative amines are butyl amine, ethylene diamine, 1,6-hexane diamine, diethylene triamine, amino amides, p-amino phenol, melamine, etc. Preferred amines are mono- or di-alkanolamines having 2 to 4 carbon atoms per alkanol group. Representative mono-alkanolamines include ethanolamine, propanolamine, butanolamine and N-methylethanolamine. Representative di-alkanolamines include diethanol amine, dipropanol amine, disopropyl amine, and dibutanol amine. A particularly preferred amine Michael donor is dialkanolamine. Representative thiol Michael donors are hydroxy ethyl thiol, hydroxy propyl thiol, etc.

The water-soluble Michael adduct crosslinking agent may be formed by reacting the Michael acceptor and the Michael donor in 1:1 molar proportions with stirring at a temperature of ambient to 95° C. over a period of approximately 10 to 360 minutes. In some embodiments the Michael adduct optionally can be at least partially present as a salt. The resulting Michael adduct in addition to being water-soluble commonly possesses a low viscosity of approximately 5 to 500 cps (preferably approximately 9 to 100 cps) when dissolved in water in a concentration of 50 percent by weight, a low surface tension of approximately 5 to 50 N/m (preferably 10 to 30 N/m) when dissolved in water in a concentration of 10 percent by weight, a low melting point of approximately −50 to 150° C. (preferably −20 to 100° C.), and a low vapor pressure of lower than 1.0 mm Hg. Such Michael adducts commonly can be formed on a relatively economical basis and can readily be processed and handled by workers.

The resulting water-soluble Michael adduct commonly displays a hydroxy equivalent of approximately 50 to 1000, and preferably approximately 70 to 150 as determined by titration or spectroscopy.

Optionally, the coating composition prior to crosslinking may include a minor concentration of aliphatic or aromatic lower molecular weight dicarboxylic, tricarboxylic or tetracarboxylic acids, such as adipic acid, maleic acid, terephthalic acid, isophthalic acid, trimellitic acid, pyromellitic acid, butane tetra carboxylic acid, citric acid, ethylenediamine tetraacetic acid, benzophenone tetracarboxylic acid, etc., in a concentration not to exceed approximately 20 percent on a molar basis of the polycarboxylic acid having a molecular weight of at least 250. In this embodiment the presence of such lower molecular weight carboxylic acid serves to lower the viscosity of the solution and to further aid the wetting and coverage of surface of fibrous material.

The preferred aqueous binding composition of the present invention comprises (a) a water-soluble polyamic acid based on a styrene maleic anhydride polymer and (b) an organic crosslinking agent. The composition may optionally further include polymeric emulsion components, adhesion promoters, coupling agents, oxygen scavengers, solvents, emulsifiers, pigments, anti-migration aids, UV absorbers, biocides, anti-foaming agents, colorants, dyes, anti-static agents, anti-oxidants, etc. When the binding composition is coated on the fibrous material from a water solution, the mass ratio of organic crosslinking agent to water-soluble polyamic acid commonly is approximately 1:10 to 10:1, preferably approximately 1:5 to 5:1, and most preferably approximately 1:3 to 3:1.

The fibrous material to which the aqueous binding composition is applied can be provided in various configurations. The plurality of fibrous components of the fibrous material can be continuous or discontinuous. For instance, the fibers can be mineral fibers, organic fibers, or polymeric fibers. The fibrous material conveniently can be provided in mat form or in any other configuration amenable for the intended end use. The bound fibrous material (e.g. mat) can serve as fibrous reinforcement in ceiling tiles or floor tiles. For instance, the bound fibers in accordance with the present invention can be incorporated in a polyvinylchloride or other matrix during the formation of flooring tiles. Also, the bound fibrous mat can serve as fibrous reinforcement when manufacturing shingles (e.g. asphalt shingles). Representative polymeric fibers include polyethylene terphthalate or polypropylene fibers which are provided in the form of a spun-bonded mat. In a preferred embodiment the fibrous material comprises glass fibers, and preferably fiberglass fibers that are supplied as long multifilamentary rovings or tows of infinite length. The filament diameters can be adjusted to meet the needs of the requirements of specific end uses. In a preferred embodiment, the fibrous material is fiberglass for the production of building insulation. In other embodiments the fibrous product is a microglass-based substrate useful for a fiberglass printed circuit board, battery separator, filter stock, or reinforcement scrim.

The binder composition product can be applied to the fibrous material as a coating by any technique capable of coating the individual fibrous components thereof. For instance, when the fibrous material is provided in a continuous length, a kiss-roll applicator, curtain coater, deep coating, spray coating, etc. can be utilized.

Once the fibrous material is coated with the aqueous binding composition heat is applied in order to achieve crosslinking of the polymer and the organic crosslinking agent to form a water-resistant cured binder in association with the fibrous material wherein adjoining fibers are bound at cross-over points. Such heating commonly is conducted at a temperature of approximately 160 to 250° C., and preferably at a temperature of approximately 200° C. Representative times for such heating commonly are at least 0.5 minutes (e.g., approximately 0.5 to 10 minutes), and preferably approximately 1 to 3 minutes. During such heating the aqueous component of the binding composition is volatized and the individual fibers are securely bound to each other.

The quantity of binder present in the resulting bound product can be adjusted to vary with the needs of specific end uses. At the conclusion of the crosslinking reaction the binder commonly is securely bound on the surfaces of the fibrous material in a concentration of approximately 1 to 50 (e.g., approximately 5 to 10) percent by weight of the fibrous material.

The binder composition of the present invention can be economically prepared and offers advantages over binder compositions that are commonly utilized in the prior art. The use of a phenol-formaldehyde component is eliminated. By successfully removing cumene and acetophenone from the polyanhydride, and particularly SMA, by using the azeotrope method of the present invention, a serious industry problem with odor is avoided. The use of a polyamic acid component based on a polyanhydride, preferably SMA, in the binding composition also offers the following advantages over the use of polycarboxylic acids of comparable molecular weight: possible neutral pH of the resin solution, minimization of process corrosion, minimization of product corrosion, low surface tension and the better wetting of the fibrous surfaces, possible water repellency of the resin when cured, possible elimination of additives commonly used with polyacrylic acid binders, and the potential for utilization of renewable sources.

The present invention also avoids the odor problem by purifying the polyanhydride based resin. Impurities such as cumene and acetophenone are removed to a large extent. Several different methods can be used as described above, with the novel use of a binary or ternary azeotrope being most preferred. The steam distillation, chromatograph and extraction methods can also be used.

Therefore, this invention offers industrial methods to easily isolate contaminants from SMA based resins. SMA based resins are manufactured from reaction of SMA with chemicals that react with anhydrides such as water, alcohols, amines, ammonia, alkanol amines etc. The reactions are carried out in water or organic solvents at both ambient or elevated temperature and pressure. They are also synthesized in supercritical fluids. Solutions of SMA based resins can be purified via the different methods discussed above and exemplified below. The amount of impurity can be reduced by at least 70% by weight, even 75% by weight, or even 90% by weight or more, e.g., 98% reduction, effectively and easily by the present process.

The following Examples are presented to provide specific representative embodiments of the present invention. It should be understood, however, that the invention is not limited to the specific details as set forth in the Examples.

Example 1

Binary Azeotrope: A water borne solution of SMA ammonia adducts (25% solid) was heated. At 93° C., a binary azeotrope mixture of cumene and acetophenone was formed that carried cumene and acetophenone out of the resin solution. After keeping the solution at 93° C. for six hours, the level of acetophenone was reduced to 2% (a 98% reduction) and the level of cumene was reduced to 25% (a 75% reduction) of their original levels. An azeotrope can also be formed under reduced pressure. Similar results in the reduction of cumene and acetophenone levels were obtained under reduced pressure (0.15 atmosphere) at 93° C. and four hours.

Example 2

Ternary Azeotrope: To a 25% solution of SMA/ammonia adduct was added toluene to lower the solid level to 20%. A ternary azeotrope of cumene, acetophenone and toluene was formed at 85° C. and carried cumene and acetophenone out of solution.

The principles, preferred embodiments, and modes of operation of the present invention have been described in the foregoing specification. The invention which is protected herein, however, is not to be construed as being limited to the particular forms disclosed, since these are regarded as being illustrative rather than restrictive. Variations and changes may be made by those skilled in the art without departing from the spirit of the invention.

We claim:

1. An aqueous binding composition for a fibrous material comprising purified styrene maleic anhydride which has been purified using an azeotrope method to reduce the amount of cumene and acetophenone in the styrene maleic anhydride by forming an aqueous solution of the styrene maleic anhydride and an azeotrope mixture of cumene and acetophenone and heating at about 93° C. to remove the azeotrope mixture of cumene and acetophenone.

2. The composition of claim 1, wherein the purified composition has a level of acetophenone that has been reduced by at least 70%.

3. An aqueous binding composition for a fibrous material comprising purified styrene maleic anhydride which has been purified using an azeotrope method to reduce the amount of cumene and acetophenone by forming an aqueous and toluene solution of the styrene maleic anhydride and an azeotrope mixture of cumene, acetophenone and toluene, and heating at about 85° C. to remove the azeotrope mixture.

4. The composition of claim 3, wherein the purified composition has a level of acetophenone that has been reduced by at least 70%.

5. The composition of claim 4, wherein the acetophenone has been reduced by at least 98%.

6. A method of preparing a purified polyanhydride based polymer comprising:
   purifying a polyanhydride based polymer using an azeotrope method to reduce organic impurities; and
   isolating a purified polyanhydride based polymer;
   wherein:
      the organic impurities comprise cumene and acetophenone; the polyanhydride based polymer comprises styrene maleic anhydride, and the azeotrope method comprises forming a binary azeotrope of cumene and acetophenone and heating at 98° C. to remove the azeotrope or forming a ternary azeotrope of cumene, acetophenone and toluene and heating at 85° C. to remove the azeotrope.

7. A method of preparing an aqueous binding composition for a fibrous material comprising:
   preparing a purified polyanhydride based polymer according to the method of claim 6; and
   incorporating the purified polyanhydride based polymer in an aqueous binding composition for a fibrous material.

8. A method of binding a fibrous material comprising:
   preparing an aqueous binding composition for a fibrous material according to the method of claim 7; and
   binding a fibrous material using the aqueous binding composition for a fibrous material.

9. The composition of claim 1, wherein the purified composition has a level of cumene that has been reduced by at least 75%.

10. The composition of claim 2, wherein the purified composition has a level of cumene that has been reduced by at least 75%.

11. The composition of claim 9, wherein the purified composition has a level of acetophenone that has been reduced by at least 98%.

12. The composition of claim 4, wherein the purified composition has a level of cumene that has been reduced by at least 75%.

* * * * *